United States Patent Office 3,594,419
Patented July 20, 1971

3,594,419
PROCESS FOR CONVERTING NITROPARAFFINS TO AMINES
Robert W. Rosenthal, Pittsburgh, Pa., assignor to Gulf Research & Development Company, Pittsburgh, Pa.
No Drawing. Filed Apr. 15, 1968, Ser. No. 721,199
Int. Cl. C07c 88/10
U.S. Cl. 260—583
3 Claims

ABSTRACT OF THE DISCLOSURE

A process which involves subjecting a nitroparaffin to reaction with hydrogen in the presence of ammonia and a hydrogenation catalyst to convert the nitroparaffin to the corresponding primary amine.

---

This invention relates to a process for preparing primary amines.

The process defined herein involves subjecting a nitroparaffin, such as one having the following structural formula

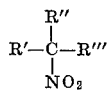

to reaction with hydrogen in the presence of ammonia and a hydrogenation catalyst to convert the nitroparaffin to the corresponding primary amine. In the above formula, R', R" and R''', the same or different, can be hydrogen, an alkyl substituent having from one to seventy carbon atoms, preferably from one to nine carbon atoms, such as methyl, ethyl, isopropyl, n-butyl, t-butyl, dodecyl, hexadecyl, nonadecyl, triacontyl, heptacontyl; an aromatic substituent, such as phenyl, naphthyl; an alicyclic substituent, such as cyclopropyl, cyclopentyl, cyclohexyl, cyclododecyl; and an heterocyclic substituent, such as pyridyl, pyrimidyl, furanyl, etc. Specific examples of nitroparaffins that can be used include 2-nitropropane, 1-nitropropane, 3-nitropentane, 4-nitroheptane, 4-nitrooctane, 2-nitrododecane, 3-nitrotridecane, 5-nitropentadecane, 3-nitroeicosane, 4-nitrooctadecane, 1-nitroheptacontane, 21-nitroheptacontane, 6-cyclopropyl-6-nitrotetradecane, 9-cyclopentyl-9-nitrooctadecane, 4-pyridyl-4-nitroeicosane, 6-cyclododecyl-6-nitroeicosane, etc.

In U.S. Pat. No. 3,366,686, dated Jan. 30, 1968, there is disclosed a process wherein nitroparaffins and ketones are subjected to reaction with hydrogen and ammonia in the presence of a hydrogenation catalyst to convert the nitroparaffins and the ketones to the corresponding primary amines. As defined in the above patent there is no reaction between the nitroparaffin and the ammonia, but there is a reaction between the ketone and the ammonia to form the corresponding hydroxy amine,

wherein R and R' are organic substituents, which is in equilibrium with the corresponding imine

and water. The imine so formed then reacts with hydrogen present to form the desired corresponding amine, while the nitroparaffin also reacts with the hydrogen present to form the desired corresponding amine and water. Accordingly, the only reason for the presence of ammonia is to convert the ketone to the corresponding imine so that the latter can then be converted to the desired amine; or, in other words, in the absence of ketone no ammonia would be required. Yet, unexpectedly, I have found that the presence of ammonia in the reaction mixture being treated wherein a nitroparaffin is the sole compound present that is capable of being converted to the corresponding primary amine results in higher yields of primary amine and reduced residue products, such as secondary and tertiary amines and amine condensation products.

The reaction of the nitroparaffins with hydrogen in the presence of ammonia and a hydrogenation catalyst can be effected in any suitable manner that will ensure contact of said materials with each other. The amount of hydrogen required will be at least about three mols per mol of said nitroparaffins, although large excesses are preferred. The amount of ammonia present can be as low as about 0.1 mol per mol of said nitroparaffins, preferably from about 0.5 to about three mols of ammonia per mol of said nitroparaffins. The reaction can be carried out, for example, at a temperature of about 25° to about 200° C., preferably about 50° to about 100° C., and a pressure of about 100 to about 2000 pounds per square inch gauge, preferably about 300 to about 700 pounds per square inch gauge. Reaction time can be, for example, from about five to about 120 minutes, preferably from about fifteen to about sixty minutes. Any hydrogenation catalyst, such as Raney nickel, Raney cobalt, supported or modified nickel catalyst, platinum, etc., can be employed. The amount of catalyst employed, based on the nitroparaffin present, can be at least about one percent by weight, preferably from about two to about twenty percent by weight. The reaction can be carried out in the presence of a solvent for the reactants and the reaction products. Examples of solvents that can be employed include methanol, ethanol, propanol, isopropanol, butanol, etc. Of these, I prefer to employ methanol, ethanol and propanol. The amount of solvent needed is that amount sufficient to solubilize the reactants and reaction products produced in the second stage of the process. This can be, for example, from about 1000 to about 3000 milliliters per total mols of nitroparaffins charged.

At the end of the reaction the nitroparaffins have been converted to the corresponding primary amines, examples of which are 2-aminopropane, 1-aminopropane, 3-aminoheptane, 4-aminoheptane, 4 - aminooctane, 2 - aminododecane, 3-aminotridecane, 5-aminopentadecane, 3-aminoeicosane, 4-aminooctadecane, 1-aminoheptacontane, 21-aminoheptacontane, 6 - amino-6-cyclopropyltetradecane, 9-amino-9-cyclopentyloctadecane, 4-amino - 4 - pyridyleicosane, 6-amino - 6 - cyclododecyleicosane, etc. These amines can be employed as cationic surface active agents, emulsifiers, microbicides and fungicides. Of particular interest is the fact that they can be methylated to dimethylaminoalkanes which can be oxidized with hydrogen peroxide to the amine oxide derivative thereof, a biodegradable, surface-active agent with high foam stability.

The primary amines are separated from the product in any convenient or suitable manner. Thus, for example, the product is subjected to filtration to remove catalyst therefrom, and the remainder is then subjected to a temperature of about 25° to about 120° C. to flash off solvent therefrom. To the product left behind there is added water, for example, at least about two volumes per volume thereof, and a mineral acid, such as hydrochloric acid, in an amount stoichiometrically required to convert the amines to the corresponding amine salts. This can be done at a temperature of about 10° to about 30° C. and atmospheric pressure. The amine salts are soluble in the water, while the remaining materials are not soluble and will form a separate layer. The two layers are separated from each other in any convenient manner, for example, by decantation. To the clear aqueous layer containing the dissolved amine salt there is added at least the stoichiometric amount of a base, such as sodium hydroxide. This action releases the amine salt back to the corresponding amine which is insoluble in water and forms a separate layer. To recover the desired amine physical separation of the two layers, for example, decantation can be employed. Alternatively, the amine can be extracted with a suitable extractant, such as chloroform or ether. Distillation of the extractant from the extract leaves behind the desired amine.

The process of this invention can be illustrated by the following:

EXAMPLE I

A mixture containing 176 grams (0.65 mol) of 2-, 3-, 4-, 5-, 6-, 7- and 8-nitrohexadecanes was dissolved in 800 milliliters (10.6 mols) of propanol-1 containing 55 grams (3.2 mols) of ammonia, and the resulting solution was then pumped at a LHSV of 1 over finely-divided nickel (Girdler Nickel Catalyst 52G) at a temperature of 175° C. and 500 pounds per square inch gauge of hydrogen pressure. The effluent was distilled and yielded 138.7 grams (0.575 mol, 88.6 percent yield) of a mixture containing 2-, 3-, 4-, 5-, 6-, 7- and 8-primary aminohexadecanes, boiling point 175° C. at five millimeter pressure.

EXAMPLE II

Example I was repeated, except that no ammonia was included in the charge. There was obtained a 76.5 percent yield of the same mixture of primary aminodecanes obtained in Example I. The presence of ammonia in Example I therefore increased the yield of desired amines by 12.1 percent.

EXAMPLE III

A blend of $C_{14}$ to $C_{18}$ paraffins (average carbon number=16.5, 10 mols) was heated to 180° C. and over a period of several hours 1.5 mols of seventy percent aqueous nitric acid was added. Twelve hundred milliliters of this mixture was stirred for three hours with 132 grams of KOH in 880 milliliters each of water and methanol. Seven hundred and sixty milliliters of unreacted paraffin separated as a top layer and the aqueous-alcohol layer was diluted with 400 milliliters of water and $CO_2$ was bubbled in. A top layer of 390 milliliters of a mixture of nitrotetradecanes, nitropentadecanes, nitrohexadecanes, nitroheptadecanes and nitrooctadecanes separated and was dissolved in 2000 milliliters of methanol containing 50 grams (2.9 mols) of ammonia, and the resulting solution was then pumped at a LHSV of 1.26 over finely-divided nickel (Girdler Nickel Catalyst 52G) at a temperature of 150° C. and 500 pounds per square inch gauge of hydrogen pressure. The effluent was distilled and yielded 221 grams of a blend of primary aminotetradecanes, aminopentadecanes, aminohexadecanes, aminoheptadecanes, and aminooctadecanes.

EXAMPLE IV

Example III was repeated except that 420 milliliters of charge was used, no ammonia was present and an LHSV of 1.21 was employed. Distillation of the product resulted in the production of 187 grams of the same amines obtained in Example III, based on the same charge used in Example III. Thus, the presence of ammonia increased the yield herein over Example III by 27 percent.

EXAMPLE V

That ammonia can be employed to convert a ketone to the corresponding amine is apparent from the following. In a flask there was placed 800 milliliters (20 mols) of methanol, 64.5 grams (0.3 mol) of a blend of 2-, 3-, 4-, 5- and 6-nitrododecanes, 18.4 grams (0.1 mol) of a blend of 2-, 3-, 4-, 5- and 6-dodecanones and 5 milliliters (0.1 mol) of 57 percent aqueous ammonia. Ammonia was not present in excess. It was believed that at atmospheric temperature and pressure the ketone reacted with ammonia to form the corresponding imine and water. Then 40 grams of finely-divided nickel (Girdler Nickel Catalyst 49B) was added to the mixture, as well as hydrogen, and the mixture was heated for 2.5 hours at 50° to 70° C. and a hydrogen pressure of 700 to 850 pounds per square inch gauge. The yield of 2-, 3-, 4-, 5- and 6-aminododecanes was found to be 0.313 mol. Since it would have been expected that 0.3 mol of the nitroparaffin would have formed 0.26 mol of the corresponding amine, the remaining 0.053 mol of amine must have come from the 0.10 mol of ketone present.

Obviously, many modifications and variations of the invention, as hereinabove set forth, can be made without departing from the spirit and scope thereof, and therefore only such limitations should be imposed as are indicated in the appended claims.

I claim:

1. In a process wherein only a nitroparaffin having from three to 20 carbon atoms is subjected to reaction with hydrogen in the presence of a hydrogenation catalyst to obtain the corresponding primary amine, the improvement which comprises carrying out the reaction in the presence of from about 0.5 to about three mols of ammonia per mol of said nitroparaffin.

2. The process of claim 1 wherein the hydrogenation catalyst is nickel.

3. The process of claim 1 wherein the reaction is carried out at a temperature of about 25° to about 200° C. and a pressure of about 100 to about 2000 pounds per square inch gauge.

References Cited

UNITED STATES PATENTS

| 3,366,686 | 1/1968 | Rosenthal et al. | 260—583(M) |
| 3,470,250 | 9/1969 | Patterson et al. | 260—583(M) |

FOREIGN PATENTS

| 784,626 | 10/1957 | Great Britain. |

OTHER REFERENCES

Niwa, Catalytic Engineering Lecture 6, Catalytic Reaction (1) Hydration, Feb. 10, 1965, Chijin-Shokan, pp. 277–278.

CHARLES B. PARKER, Primary Examiner

R. L. RAYMOND, Assistant Examiner

U.S. Cl. X.R.

260—256.4, 293, 347.7, 563, 570, 570.8, 570.9

PO-1050
(5/69)

UNITED STATES PATENT OFFICE
CERTIFICATE OF CORRECTION

Patent No. 3,594,419      Dated July 20, 1971

Inventor(s) Robert W. Rosenthal

It is certified that error appears in the above-identified patent and that said Letters Patent are hereby corrected as shown below:

Column 1, line 36, after "phenyl" please insert "benzyl".

Signed and sealed this 28th day of December 1971.

(SEAL)
Attest:

EDWARD M. FLETCHER, JR.　　　　ROBERT GOTTSCHALK
Attesting Officer　　　　　　　　Acting Commissioner of Patents